United States Patent
Shinkai et al.

(10) Patent No.: US 11,374,464 B2
(45) Date of Patent: Jun. 28, 2022

(54) ROTARY ELECTRIC MACHINE

(71) Applicant: DENSO CORPORATION, Kariya (JP)

(72) Inventors: Tomoyuki Shinkai, Kariya (JP); Takashi Satou, Kariya (JP); Takeo Maekawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 16/664,990

(22) Filed: Oct. 28, 2019

(65) Prior Publication Data
US 2020/0059134 A1 Feb. 20, 2020

Related U.S. Application Data

(63) Continuation of application No. PCT/JP2018/016769, filed on Apr. 25, 2018.

(30) Foreign Application Priority Data

Apr. 28, 2017 (JP) .............................. JP2017-090085

(51) Int. Cl.
*H02K 9/193* (2006.01)
*H02K 11/25* (2016.01)
(Continued)

(52) U.S. Cl.
CPC .............. *H02K 9/193* (2013.01); *H02K 3/24* (2013.01); *H02K 3/50* (2013.01); *H02K 11/25* (2016.01)

(58) Field of Classification Search
CPC ........ H02K 9/193; H02K 9/197; H02K 11/25; H02K 3/50
(Continued)

(56) References Cited

U.S. PATENT DOCUMENTS 5,111,090 A * 5/1992 Otake ...................... H02K 9/19
310/54
5,127,485 A 7/1992 Wakuta et al.
(Continued)

FOREIGN PATENT DOCUMENTS

DE 10154920 A1 * 5/2003 ............... G01K 1/16
DE 102011084229 A1 * 4/2013 ............. H02K 11/25
(Continued)

OTHER PUBLICATIONS

Nakano (JP 2009296772 A) English Translation (Year: 2009).*
(Continued)

*Primary Examiner* — Tulsidas C Patel
*Assistant Examiner* — Robert E Mates
(74) *Attorney, Agent, or Firm* — Oliff PLC

(57) ABSTRACT

A detection part of a temperature detection element is mounted to ends of drawn portions which are further protruded in the axial direction than coil end portions. The detection part and the ends of the drawn portions provided with the detection part are covered with a covering member. The ends of the drawn portions provided with the detection part and covered with the covering member are inserted into a through hole of a wall member which is disposed so as to axially face an axial end face of a stator core. In this case, the detection part is located at a position deeper (on the rear side) than a position of a stator core side opening of the through hole.

11 Claims, 15 Drawing Sheets

(51) Int. Cl.
*H02K 3/24* (2006.01)
*H02K 3/50* (2006.01)

(58) Field of Classification Search
USPC .................................................. 310/54, 68 C
See application file for complete search history.

(56) References Cited

U.S. PATENT DOCUMENTS

| | | | | |
|---|---|---|---|---|
| 6,153,954 A | * | 11/2000 | Uchida | H02K 11/25 |
| | | | | 310/68 C |
| 2010/0192922 A1 | * | 8/2010 | Masuda | F02M 37/106 |
| | | | | 123/509 |
| 2016/0013705 A1 | | 1/2016 | Takei | |

FOREIGN PATENT DOCUMENTS

| | | | | |
|---|---|---|---|---|
| FR | 2935562 A1 | * | 3/2010 | ........... H02K 11/225 |
| JP | H02-13246 A | | 1/1990 | |
| JP | 2009296772 A | * | 12/2009 | |
| JP | 2011-30288 A | | 2/2011 | |
| JP | 2013-219937 A | | 10/2013 | |

OTHER PUBLICATIONS

Yousefi (DE 10154920 A1 ) English Translation (Year: 2003).*
Bahr (DE 102011084229 A1 ) English Translation (Year: 2013).*
Linda (FR 2935562 A1 ) English Translation (Year: 2010).*
Aug. 7, 2018 International Search Report issued in International Patent Application No. PCT/JP2018/016769.

* cited by examiner

ROTARY ELECTRIC MACHINE

CROSS-REFERENCE TO RELATED APPLICATION

The present application is a continuation application of International Application No. PCT/JP2018/016769, filed Apr. 25, 2018, which claims priority to Japanese Patent Application No. 2017-090085, filed Apr. 28, 2017. The contents of these applications are incorporated herein by reference in their entirety.

BACKGROUND

1. Technical Field

The present disclosure relates to a rotary electric machine.

2. Related Art

There are known rotary electric machines provided with a temperature detection element for detecting temperature of a stator coil and configured to inject a liquid coolant into a space defined by a housing.

SUMMARY

The present disclosure provides a rotary electric machine. A rotary electric machine that is a mode of the present disclosure includes a rotary shaft, a rotor, a stator core, a stator coil, a housing, a liquid coolant, a temperature detection element, a covering member and a wall member. The stator coil is formed of a conductor. The stator coil has coil end portions and drawn portions, and is provided to the stator core. A detection part of the temperature detection element is mounted to ends of drawn portions which are further protruded in the axial direction than coil end portions. The detection part and the ends of the drawn portions provided with the detection part are covered with a covering member. The ends of the drawn portions provided with the detection part and covered with the covering member are inserted into a through hole of a wall member which is disposed so as to axially face an axial end face of the stator core. In this case, the detection part is located at a position deeper (on the rear side) than a position of the stator core side opening of the through hole.

DETAILED DESCRIPTION OF THE PREFERRED EMBODIMENTS

Figure 1:
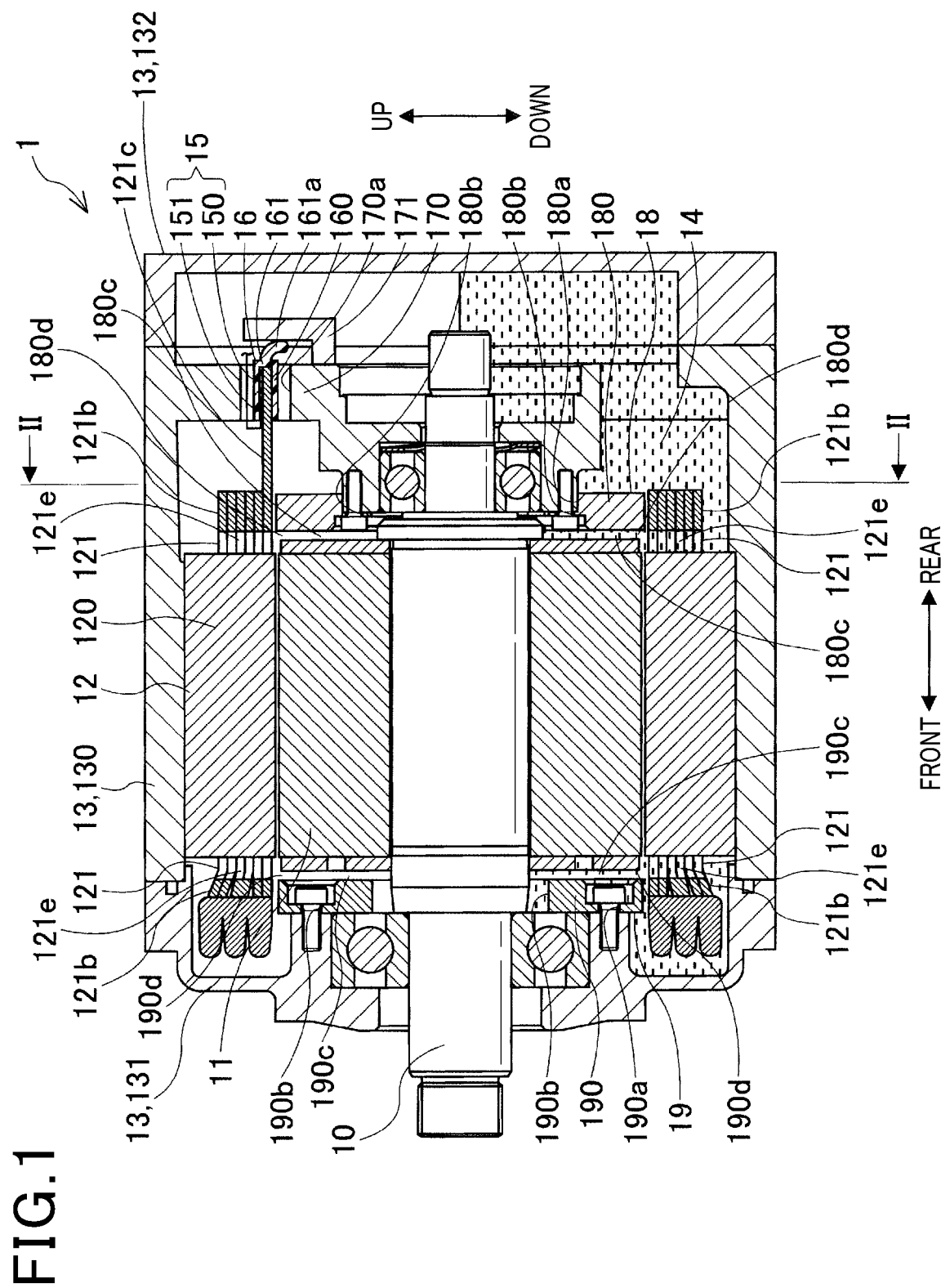
FIG. 1 is an axial cross-sectional view of a motor-generator according to an embodiment of the present disclosure.

There are known rotary electric machines provided with a temperature detection element for detecting temperature of a stator coil and configured to inject a liquid coolant into a space defined by a housing. Such a rotary electric machine is disclosed, for example, in JP 2016-19349 A (hereinafter, PTL1).

A rotary electric machine described in PTL1 includes a rotary shaft, a stator core, a stator winding, a housing, a thermistor and a liquid coolant. It should be noted that the stator winding, the thermistor and the liquid coolant respectively correspond to the stator coil, the temperature detection element and the liquid coolant.

A rotor is fixed to the rotary shaft. The stator core is disposed such that the inner peripheral surface thereof faces the outer peripheral surface of the rotor in the radial direction via a predetermined clearance. The stator winding, which is configured by a conductor, is provided to the stator core. The stator winding has coil ends. The coil ends are protruded in the axial direction from an axial end face of the stator core. The housing houses the rotor, the stator core and the stator winding and rotatably supports the rotary shaft. The thermistor is disposed in a state of being in contact with a jumper wire which is located on the outermost side of the coil ends. Above the thermistor in a vertical direction, there is disposed an output wire of the stator winding. The output wire of the stator winding is provided parallel to the thermistor via a predetermined clearance. Thus, the rotary electric machine is configured such that the liquid coolant, if dropped from above the coil ends, will be blocked by the output wire of the stator winding and will not be directly splashed over the thermistor.

When the rotor of the rotary electric machine set forth above rotates, the liquid coolant is dispersed around the rotor. The liquid coolant is dispersed in all directions. In this case, the liquid coolant is also dispersed toward the thermistor from directions other than the direction right above. Consequently, the dispersed liquid coolant is directly splashed over the thermistor. Therefore, temperature of the stator winding can no longer be correctly detected in the rotary electric machine.

The present disclosure provides a rotary electric machine capable of preventing liquid coolant that has been dispersed with the rotation of a rotor from splashing over a detection part of a temperature detection element, and capable of correctly detecting temperature of a stator coil.

A rotary electric machine that is a mode of the present disclosure includes a rotary shaft, a rotor, a stator core, a stator coil, a housing, a liquid coolant, a temperature detection element, a covering member and a wall member. The stator coil is formed of a conductor. The stator coil has coil end portions and drawn portions, and is provided to the stator core. The rotor is fixed to the rotary shaft. The stator core is disposed such that the inner peripheral surface thereof faces the outer peripheral surface of the rotor in the radial direction via a predetermined clearance. The coil end portions are protruded in the axial direction from an axial end face of the stator core. The drawn portions are further protruded in the axial direction than the coil end portions. The housing covers both axial end faces of the stator core and holds the rotor, the coil end portions and the drawn portions. The housing rotatably supports the rotary shaft. The coolant is injected into a space defined by the housing and flows into at least a part of clearance between the outer peripheral surface of the rotor and the inner peripheral surface of the stator. The temperature detection element is mounted to ends of the drawn portions such that the detection part is in contact with the ends. The covering member covers the detection part of the temperature detection element and the ends of the drawn portions provided with the detection part. The wall member has a through hole for inserting therethrough the ends of the drawn portions provided with the detection part of the temperature detection element and covered with the covering member. The wall member is provided to the housing so as to axially face an axial end face of the stator core via a predetermined clearance. The wall member is provided to the housing such that the detection part is located at a position deeper (on the rear side) than a position of a stator core side opening of the through hole.

With this configuration of the rotary electric machine that is a mode of the present disclosure, the detection part of the temperature detection element is mounted to the ends of the drawn portions which are further protruded in the axial direction than the coil end portions. Therefore, compared to the case where the detection part is mounted to the coil end portions, the coolant which is dispersed with the rotation of the rotor is unlikely to be splashed over the detection part. The detection part and the ends of the drawn portions provided with the detection part are covered with a covering member. Therefore, the dispersed coolant is not directly splashed over the detection part. Furthermore, the ends of the drawn portions provided with the detection part and covered with the covering member are inserted into the through hole of the wall member which is disposed so as to axially face an axial end face of the stator core. In this case, the detection part is located at a position deeper (on the rear side) than a position of a stator core side opening of the through hole. Therefore, the dispersed coolant is blocked by the wall member and is unlikely to be splashed over the detection part. Accordingly, if the liquid coolant is dispersed with the rotation of the rotor in the rotary electric machine of the present disclosure, the dispersed coolant is prevented from splashing over the detection part of the temperature detection element. Consequently, in the rotary electric machine of the present disclosure, temperature of the stator coil can be correctly detected.

The rotary electric machine that is a mode of the present disclosure may be configured to include a regulation member that regulates a flow direction of the coolant. The flow direction regulation member is provided so as to axially face an axial end face of the rotor via a predetermined clearance. The flow direction regulation member regulates the flow direction of the coolant using a gap formed between itself and an axial end face of the rotor. With this configuration of the rotary electric machine of the present disclosure, the direction of spraying or dispersion of the coolant caused with the rotation of the rotor can be regulated by the flow direction regulation member in the radial direction of the rotor. In this way, the rotary electric machine of the present disclosure can prevent the coolant from being dispersed toward the detection part of the temperature detection element which is mounted to the ends of the axially protruded drawn portions. Accordingly, if the coolant is dispersed with the rotation of the rotor in the rotary electric machine of the present disclosure, the dispersed coolant is reliably prevented from splashing over the detection part of the temperature detection element. When the rotor rotates, a centrifugal force is generated. The centrifugal force causes flow in the reserved coolant. Thus, the coolant is collected to the gap formed between the axial end face of the rotor and the flow direction regulation member. The collected coolant is discharged in the radial direction by the centrifugal force of the rotor. Consequently, a negative pressure is generated due to the Venturi effect, thereby discharging the coolant that has flowed in between the outer peripheral surface of the rotor and the inner peripheral surface of the stator core. Thus, the rotary electric machine of the present disclosure can decrease loss of the coolant that has flowed in between the outer peripheral surface of the rotor and the inner peripheral surface of the stator core, the loss being due to the shear force generated when the rotor rotates. Furthermore, the rotary electric machine of the present disclosure can improve performance of cooling the coil end portions, owing to the coolant that is discharged from between the outer peripheral surface of the rotor and the inner peripheral surface of the stator core. The rotary electric machine of the present disclosure limits the amount of the coolant in the gap as the velocity of the rotor increases. Therefore, the rotary electric machine of the present disclosure minimizes agitation loss of the coolant due to increase of velocity of the rotor.

In the rotary electric machine that is a mode of the present disclosure, the covering member may be configured to include a cylindrical part and a bottom part. The cylindrical part covers not only the detection part of the temperature detection element, but also the outer peripheries of the ends of the drawn portions provided with the detection part. The bottom part closes the opening of the cylindrical part, the opening facing the ends of the drawn portions. With this configuration of the rotary electric machine of the present disclosure, the covering member can reliably cover the detection part of the temperature detection element and the ends of the drawn portions provided with the detection part. Accordingly, in the rotary electric machine of the present disclosure, the coolant dispersed with the rotation of the rotor is reliably prevented from being directly splashed over the detection part of the temperature detection element.

In the rotary electric machine that is a mode of the present disclosure, the cylindrical part may be configured as a multi-layered cylindrical part having a plurality of inner and outer tubular layers, with air layers being provided between the plurality of layers. With this configuration of the rotary electric machine of the present disclosure, the air layers, which are less likely to conduct heat, can contribute to preventing the detection part of the temperature detection element from being thermally affected. Accordingly, in the rotary electric machine of the present disclosure, the detection part is ensured not to be thermally affected by the coolant even when the coolant is splashed over the covering member.

The rotary electric machine that is a mode of the present disclosure may be configured to include a contact member. The contact member is provided to the housing so as to face and contact the bottom part of the covering member in the axial direction. With this configuration of the rotary electric machine of the present disclosure, the contact member can support the ends of the drawn portions via the covering member. In this way, the rotary electric machine of the present disclosure can reduce or prevent damage to the drawn portions provided with the detection part of the temperature detection element, even when vibration due to rotation of the rotor is applied.

In the rotary electric machine that is a mode of the present disclosure, it may be so configured that the stator coil has a plurality of sets of drawn portions, and the detection part of the temperature detection element is disposed at ends of the drawn portions which are protruded most in an axial direction among the plurality of sets of drawn portions. With this configuration of the rotary electric machine of the present disclosure, the detection part can be disposed at a further distant position in the axial direction. Accordingly, the rotary electric machine of the present disclosure can further reduce the probability that the coolant dispersed by the rotation of the rotor is splashed over the detection part.

In the rotary electric machine that is a mode of the present disclosure, it may be so configured that the drawn portions provided with the detection part of the temperature detection element are disposed at a position where they are not immersed in the coolant in a state in which the rotor is not rotating. When the rotor rotates, the coolant is dispersed with the rotation. Consequently, the level of the liquid surface of the coolant, which is reserved in the space defined by the housing, is lowered compared to the case where the rotor is not rotating. Therefore, the drawn portions disposed at a position where they are not immersed in the coolant in a state in which the rotor is not rotating will not be immersed in the coolant even when the rotor starts rotating. With this configuration of the rotary electric machine of the present disclosure, the detection part is not immersed in the coolant, regardless of whether the rotor is rotating or not. Accordingly, in the rotary electric machine of the present disclosure, temperature of the stator coil can be constantly detected by the temperature detection element, regardless of whether the rotor is rotating or not.

In the rotary electric machine that is a mode of the present disclosure, it may be so configured that the drawn portions provided with the detection part of the temperature detection element are disposed at a position where the drawn portions are immersed in the coolant when the rotor is not rotating and are not immersed in the coolant when a rotating speed of the rotor has become not less than a predetermined value. With this configuration of the rotary electric machine of the present disclosure, the liquid surface of the coolant is lowered when the rotating speed of the rotor has become not less than a predetermined value, so that the detection part will no longer be immersed in the coolant. Therefore, in the rotary electric machine of the present disclosure, temperature of the stator coil can be detected by the temperature detection element when the rotating speed of the rotor is not less than a predetermined value. In the rotary electric machine of the present disclosure, the detection part is immersed in the coolant when the rotor is not rotating. Therefore, in the rotary electric machine of the present disclosure, temperature of the coolant can be detected by the temperature detection element when the rotor is not rotating. In other words, in the rotary electric machine of the present disclosure, temperature of the coolant can be detected when the rotor is not rotating, by using the temperature detection element provided for detecting temperature of the stator coil. Accordingly, in the rotary electric machine of the present disclosure, a temperature detection element for detecting temperature of the coolant is not required to be separately provided and can be omitted from the components. In other words, in the rotary electric machine of the present disclosure, the number of parts can be reduced and thus the number of processes of assemblage can be reduced.

In the rotary electric machine that is a mode of the present disclosure, it is preferred that the covering member has thermal conductivity that is lower than that of the conductor configuring the stator coil. With this configuration of the rotary electric machine of the present disclosure, the covering member can contribute to preventing the detection part of the temperature detection element from being thermally affected. Accordingly, in the rotary electric machine of the present disclosure, the detection part is ensured not to be thermally affected by the coolant even when the coolant is splashed over the covering member.

In the rotary electric machine that is a mode of the present disclosure, it may be so configured that the covering member presses the detection part of the temperature detection element against the ends of the drawn portions. With this configuration of the rotary electric machine of the present disclosure, the covering member can reliably bring the detection part into contact with the ends of the drawn portions. Consequently, in the rotary electric machine of the present disclosure, temperature of the stator coil can be reliably detected.

In the rotary electric machine that is a mode of the present disclosure, it is preferred that the covering member is made of rubber or a resin that shrinks when heated. With this configuration of the rotary electric machine of the present disclosure, thermal conductivity of the covering member is reliably made lower than that of the conductor configuring the stator coil. With this configuration of the rotary electric machine of the present disclosure, the covering member can reliably press the detection part of the temperature detection element against the ends of the drawn portions.

The technique of the present disclosure will be more specifically described by way of an embodiment. The present embodiment shows an example of applying a rotary electric machine that is a mode of the present disclosure to a motor-generator installed in a vehicle.

Referring to FIGS. 1 to 19, a configuration of a motor-generator will be described. The front-rear direction or the up-down direction in the figures are indicated for convenience of defining directions. To clarify the configuration including a liquid coolant, FIGS. 1 and 2 are illustrated with the solid line indicating a surface of the liquid coolant and the broken lines indicating portions immersed in the liquid coolant.

Figure 2:
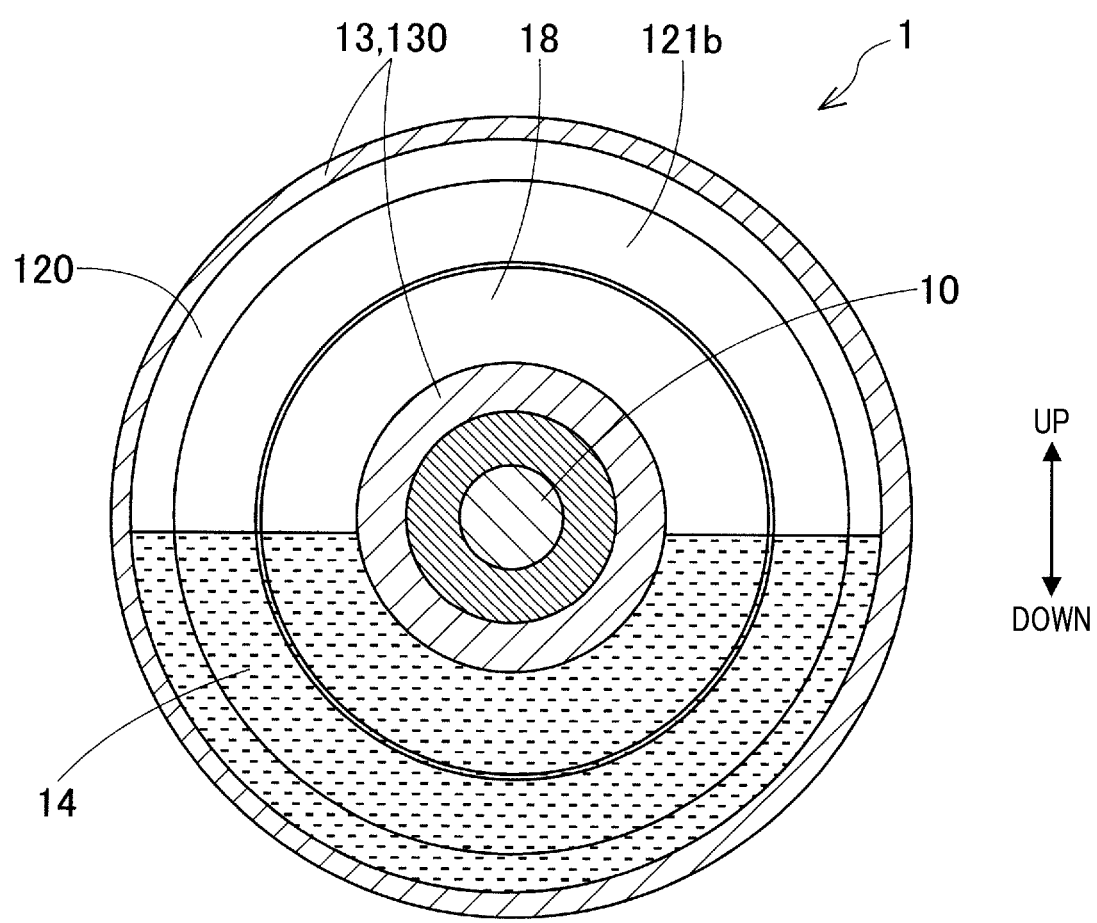
FIG. 2 is a cross-sectional view taken along the line II-II of FIG. 1.

FIGS. 1 and 2 show a motor-generator 1 installed in a vehicle. The motor-generator 1 receives a supply of electrical power from a battery to operate as a motor that generates drive force for driving the vehicle. The motor-generator 1 also receives a supply of drive force from an engine to operate as a generator that generates electrical power for charging the battery. The motor-generator 1 includes a rotary shaft 10, a rotor 11, a stator 12, a housing 13, a coolant 14, a temperature detection element 15, a covering member 16, a wall member 170, a contact member 171 and flow direction regulation members 18 and 19.

The rotary shaft 10 is a cylindrical member made of metal. The rotary shaft 10, to which the rotor 11 is fixed, rotates together with the rotor 11.

The rotor 11 is an annular member that includes permanent magnets for configuring part of a magnetic path and generating magnetic flux. The rotor 11 generates torque through interlinkage of magnetic flux generated in the stator 12. The rotor 11 is rotated by the drive force supplied from the engine. Thus, the rotor 11 causes the generated magnetic flux to interlink with a stator coil 121 and causes the stator coil 121 to generate alternating current. The rotor 11 is fixed to the rotary shaft 10.

The stator 12 is a member that configures part of the magnetic path and generates magnetic flux when current is passed therethrough. The stator 12 is a member that configures part of the magnetic path and generates alternating current by being interlinked with the magnetic flux generated in the rotor 11. The stator 12 includes a stator core 120 and the stator coil 121.

Figure 3:
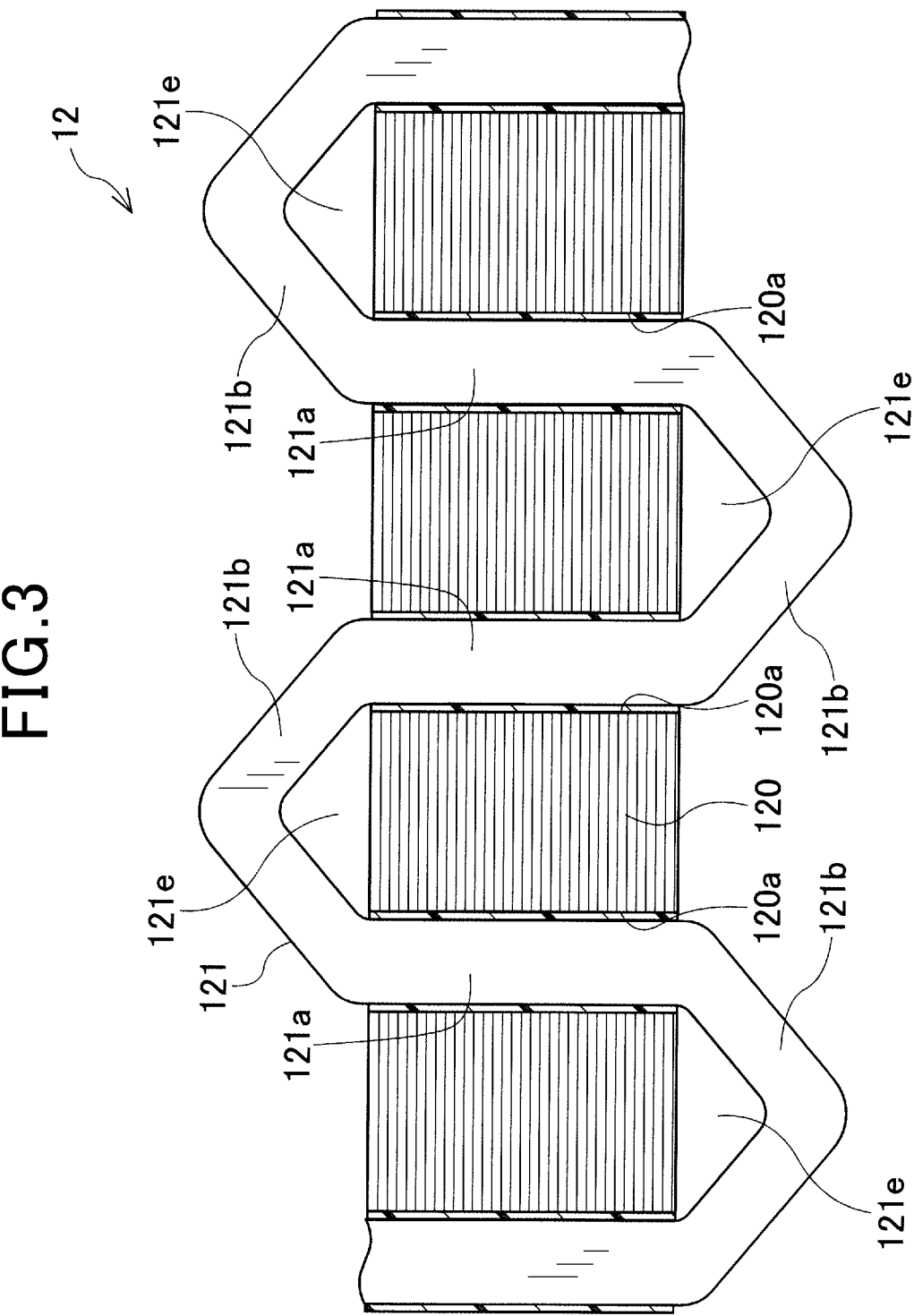
FIG. 3 is a cross-sectional view of a stator taken along the circumferential direction and as viewed from the shaft center.
Figure 4:
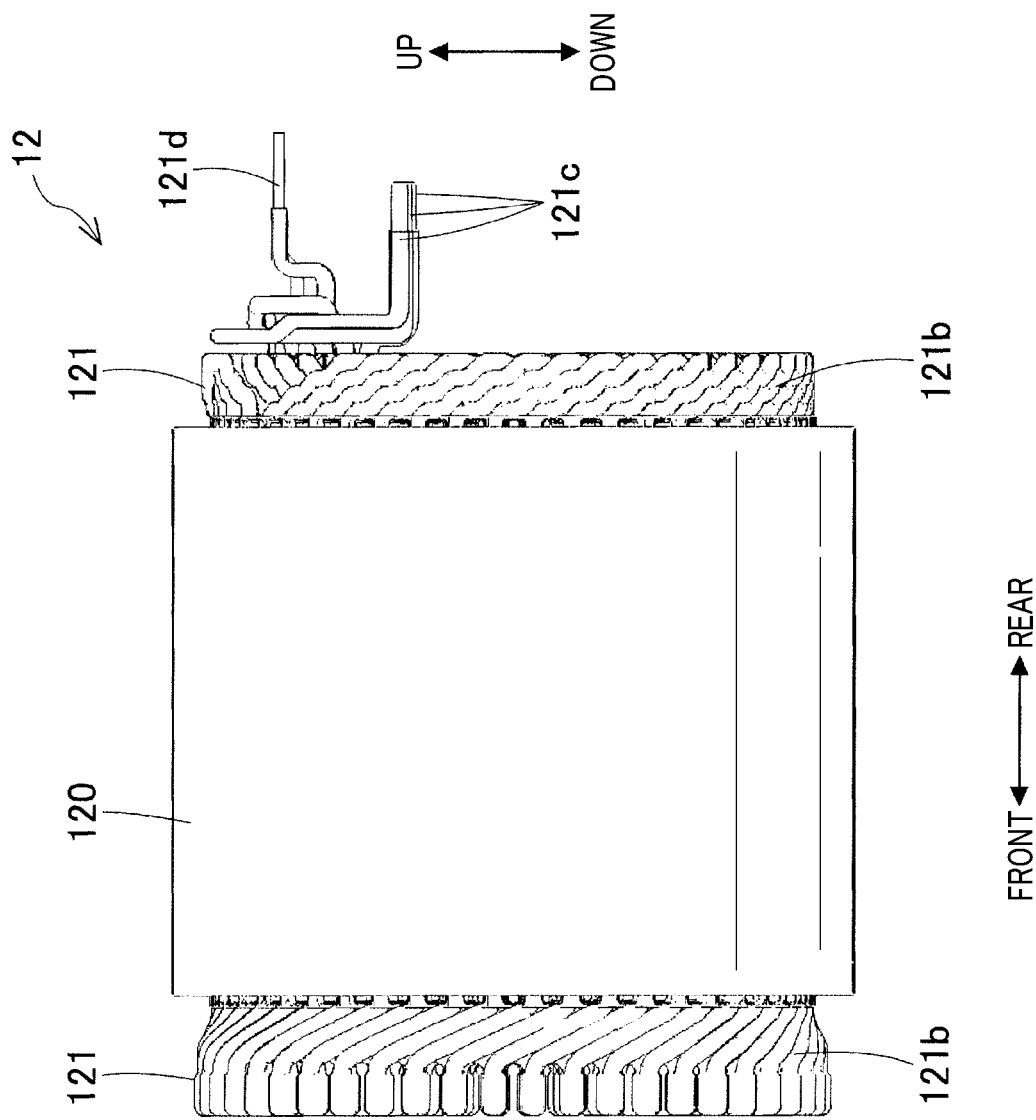
FIG. 4 is a side view of the stator.

The stator core 120 is an annular member made of a magnetic material. The stator core 120 is a member that configures part of the magnetic path and holds the stator coil 121. As shown in FIG. 3, the stator core 120 includes a plurality of slots 120*a* passing therethrough from a first end to a second end in the axial direction. As shown in FIGS. 1 and 2, the stator core 120 has an inner peripheral surface that faces an outer peripheral surface of the rotor 11 via a predetermined clearance.

The stator coil 121 is a member that generates magnetic flux when current is passed therethrough. The stator coil 121 is a member that generates alternating current by being interlinked with the magnetic flux generated in the rotor 11. The stator coil 121 is configured by connecting a U-phase coil, a V-phase coil and a W-phase coil. The stator coil 121 is formed of a conductor. Specifically, the stator coil 121 is made of copper. The conductor has a surface covered with an insulating member except for end portions that establish connection. As shown in FIGS. 3 to 7, the stator coil 121 includes slot-held portions 121*a*, coil end portions 121*b* and drawn portions (terminal portions) 121*c* and 121*d*.

As shown in FIG. 3, the slot-held portions 121*a* are held by the respective slots 120*a* of the stator core 120.

As shown in FIGS. 3 to 7, the coil end portions 121*b* are each axially protruded from an axial end face of the stator core 120 and turned over to form a V shape. As shown in FIG. 3, each axial end face of the stator core 120 and the coil end portions 121*b* define spaces 121*e*.

Figure 5:
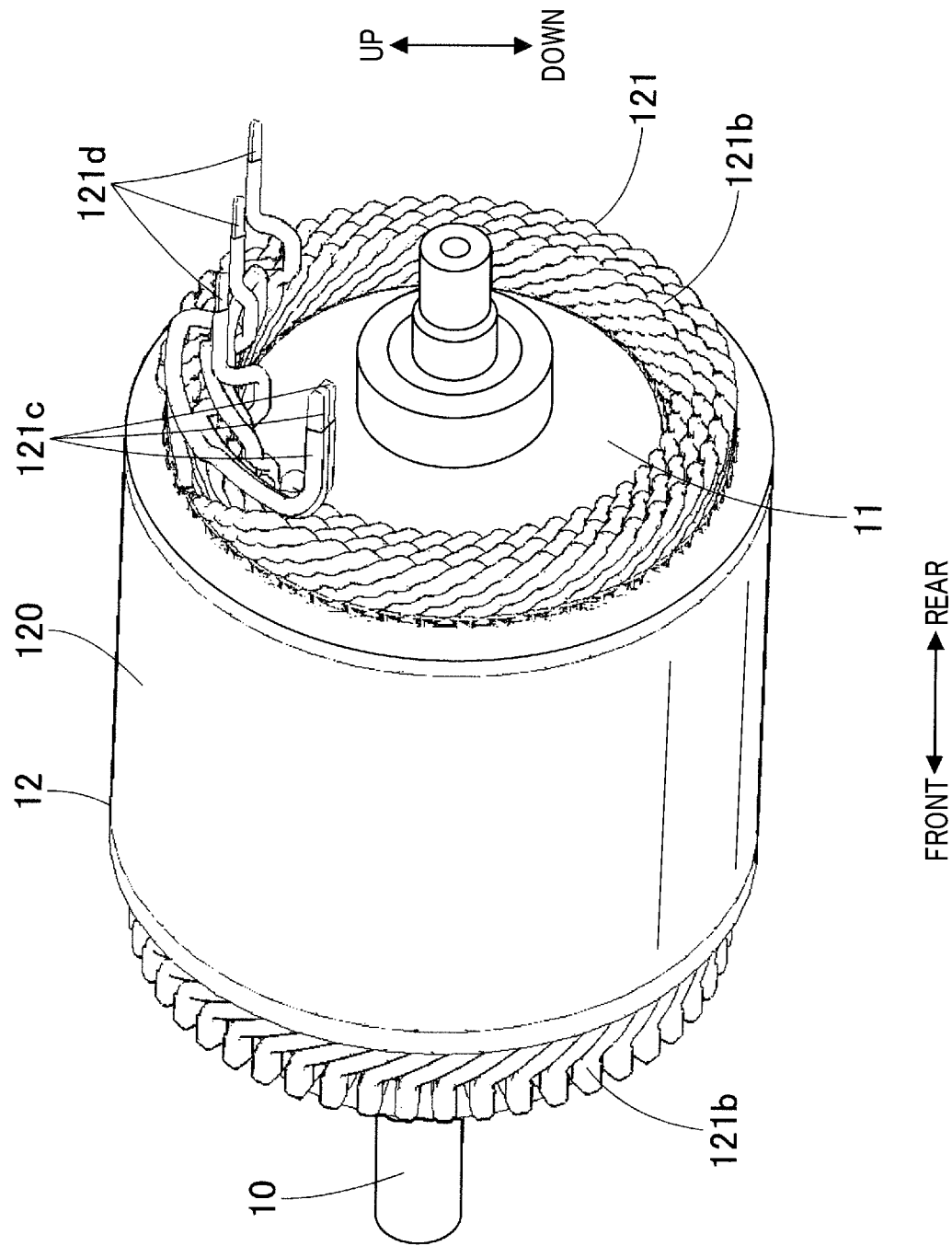
FIG. 5 is a perspective view of a rotary shaft, a rotor and a stator.
Figure 6:
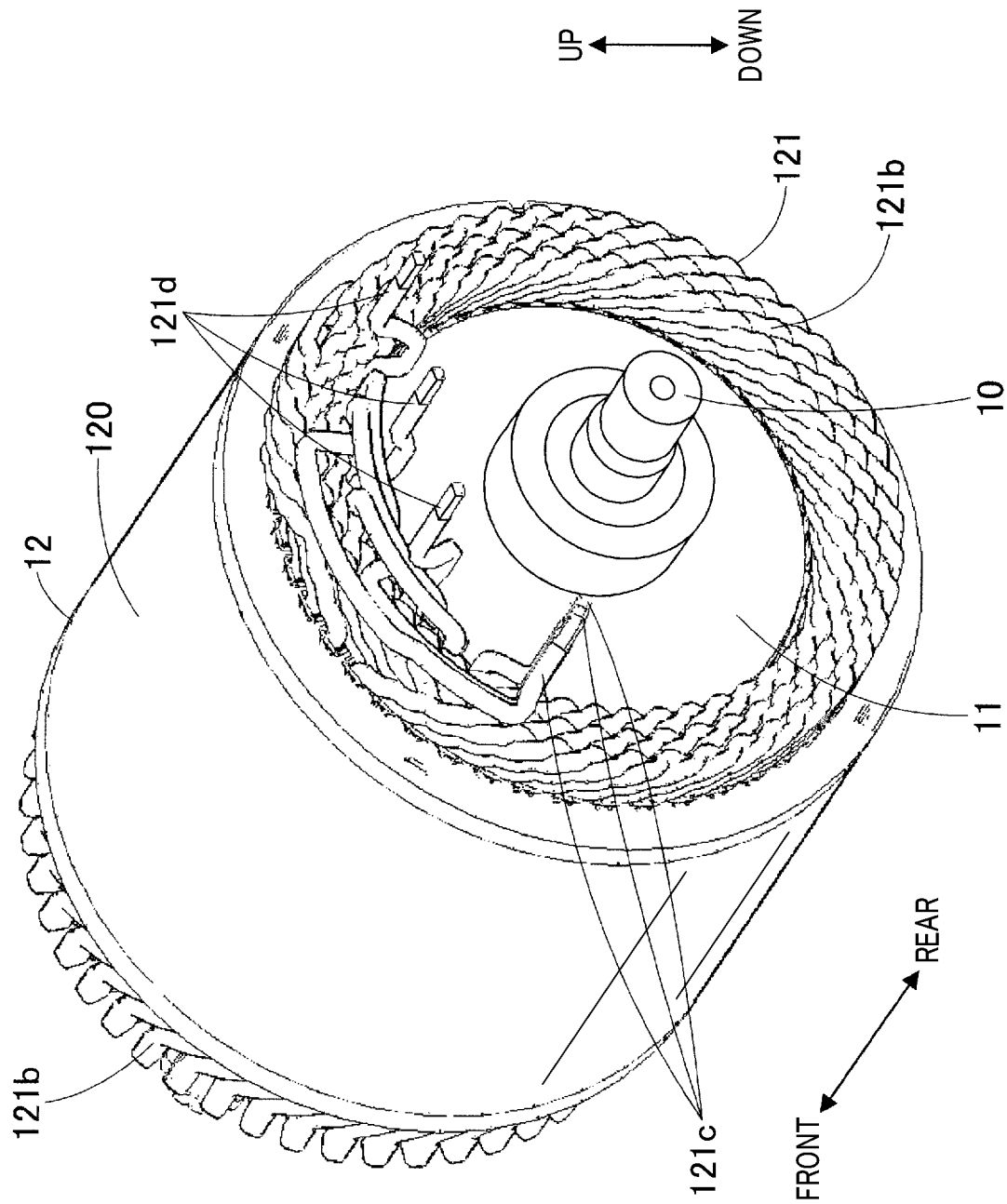
FIG. 6 is a perspective view of the rotary shaft, the rotor and the stator as viewed from a different angle.
Figure 7:
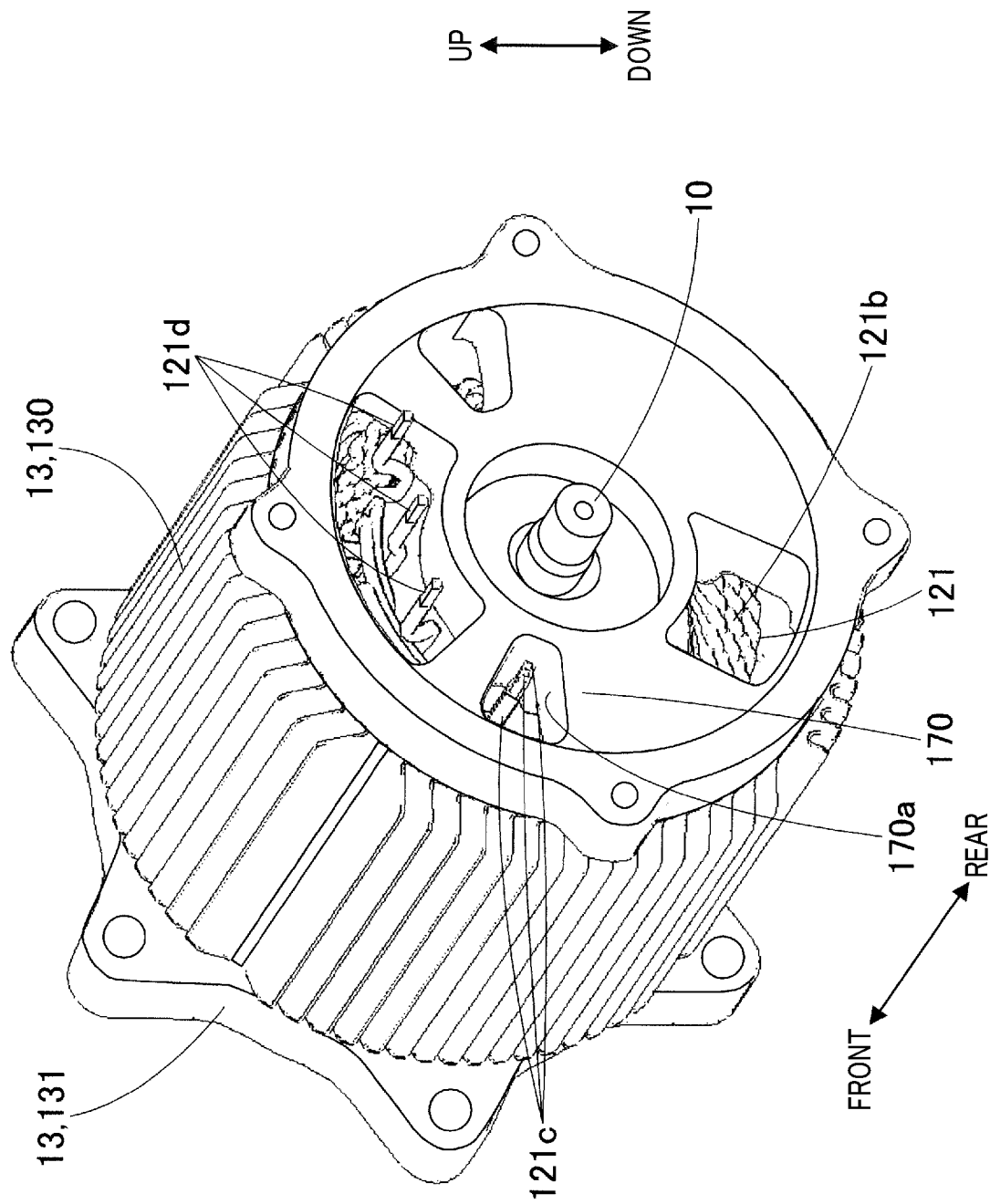
FIG. 7 is a perspective view of the rotary shaft, the rotor and the stator held in a housing.

As shown in FIGS. 4 to 7, the drawn portions 121*c* are provided as a common connection portion. The drawn portions 121*c* are drawn to form a neutral point of the stator coil 121. Specifically, the drawn portions 121*c* correspond to first ends of the U-, V- and W-phase coils configuring the stator coil 121. The drawn portions 121*c* are further protruded in the axial direction than the coil end portions 121*b*. The drawn portions 121*c* are disposed at a position where they are not immersed in the coolant 14 when the rotor 11 is not rotating. Specifically, as shown in FIGS. 5 to 7, the drawn portions 121*c* are provided at an upper level than the level of the shaft center of the rotary shaft 10. The ends of the drawn portions 121*c* are welded together.

As shown in FIGS. 4 to 7, the drawn portions 121*d* are connected to a control unit. The drawn portions 121*d* are drawn so as to respectively form ends of the U-, V- and W-phase coils. Specifically, the drawn portions 121*d* correspond to second ends of the U-, V- and W-phase coils configuring the stator coil 121. The drawn portions 121*d* are further protruded in the axial direction than the coil end portions 121*b*. The drawn portions 121*d* are disposed at positions where they are not immersed in the coolant 14 when the rotor 11 is not rotating. Specifically, as shown in FIGS. 5 to 7, the drawn portions 121*d* are provided at an upper level than the level of the shaft center of the rotary shaft 10. The ends of the drawn portions 121*d* are welded to busbars, or the like for wiring in the control unit.

As shown in FIG. 1, the housing 13 is a member that covers both axial end faces of the stator core 120 and holds the rotor 11, the coil end portions 121*b* and the drawn portions 121*c* and 121*d*. The housing 13 is a member that rotatably supports the rotary shaft 10. The housing 13 also serves as a member that defines a space for reserving the coolant 14. The housing 13 includes a center housing 130, a front housing 131 and a rear housing 132.

The center housing 130 is a cylindrical member made of metal. The center housing 130 holds the rotor 11 and the stator 12. The center housing 130 rotatably supports the rear end of the rotary shaft 10. The rotor 11 and the stator 12 are held in the center housing 130. The outer peripheral surface of the stator core 120 is fixed to the inner peripheral surface of the center housing 130. The rear end of the rotary shaft 10 is rotatably supported by the center housing 130 via a bearing.

The front housing 131 is a disk-like member made of metal. The front housing 131 covers the front opening of the center housing 130. The front housing 131 rotatably supports the front end of the rotary shaft 10. The front housing 131 is fixed to the center housing 130 to cover the front opening thereof. The front end of the rotary shaft 10 is rotatably supported by the front housing 131 via a bearing.

The rear housing 132 is a disc-like member made of metal. The rear housing 132 covers the rear opening of the center housing 130. The rear housing 132 is fixed to the center housing 130 to cover the rear opening thereof.

As shown in FIGS. 1 and 2, the coolant 14 is a fluid substance that is injected into a space defined by the housing 13 to cool the rotor 11 and the stator 12. Specifically, the coolant 14 is oil. The motor-generator 1 is disposed such that the axial direction of the rotary shaft 10 matches the front-rear direction. The coolant 14 is injected into the space such that, In a state in which the rotor 11 is not rotating, the level of the liquid surface substantially matches the level of the shaft center of the rotary shaft 10. Therefore, part of the rotary shaft 10 lower than the shaft center is immersed in the coolant 14 when the rotor 11 is not rotating. Consequently, on a side lower than the shaft center of the rotary shaft 10, the coolant 14 flows in between the outer peripheral surface of the rotor 11 and the inner peripheral surface of the stator 12. The drawn portions 121*c* are positioned at an upper level than the level of the shaft center of the rotary shaft when the rotor 11 is not rotating. Therefore, the drawn portions 121*c* are not immersed in the coolant 14 when the rotor 11 is not rotating.

Figure 8:
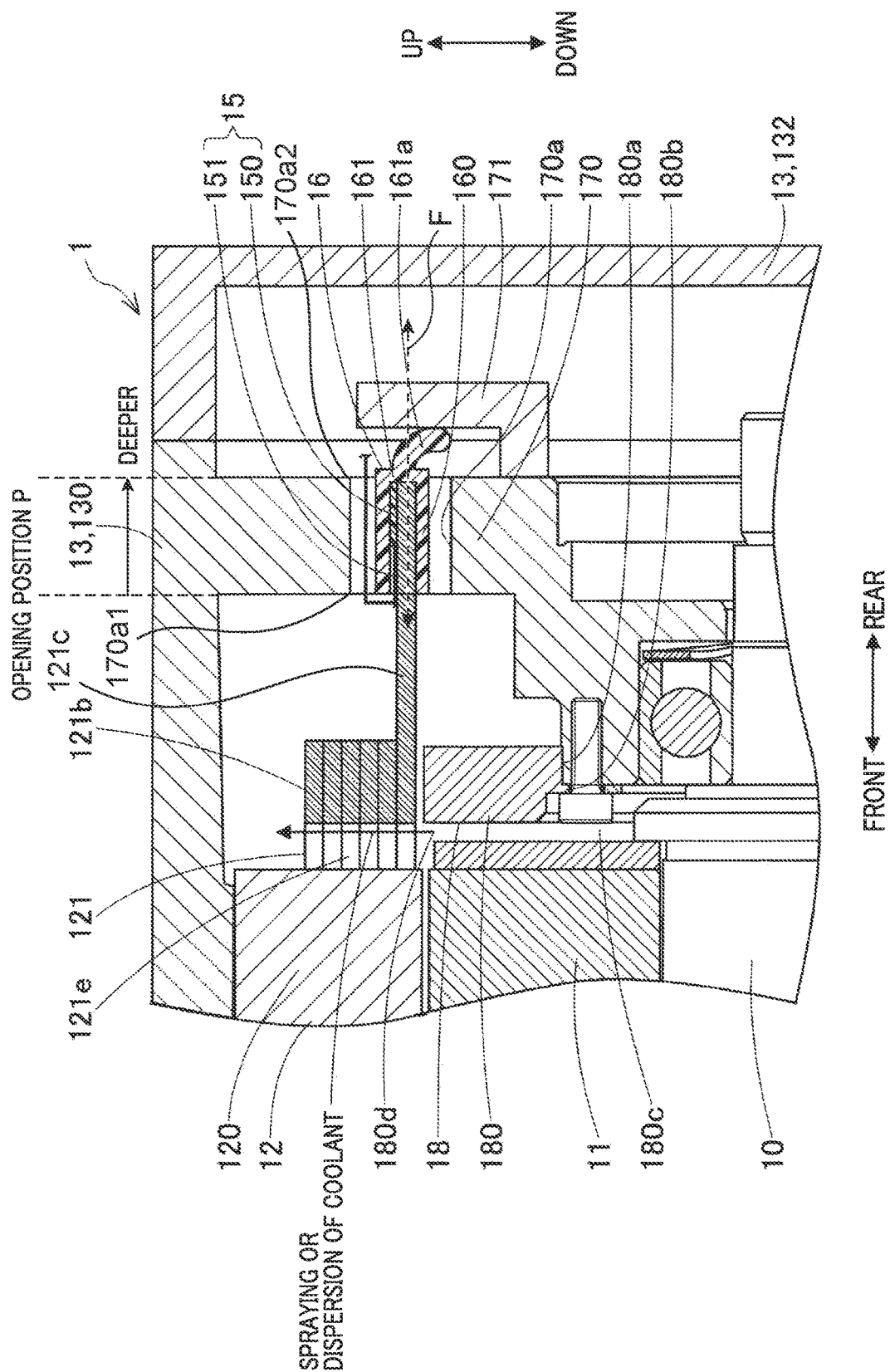
FIG. 8 is an enlarged cross-sectional view of a temperature detection element and the surroundings thereof.
Figure 9:
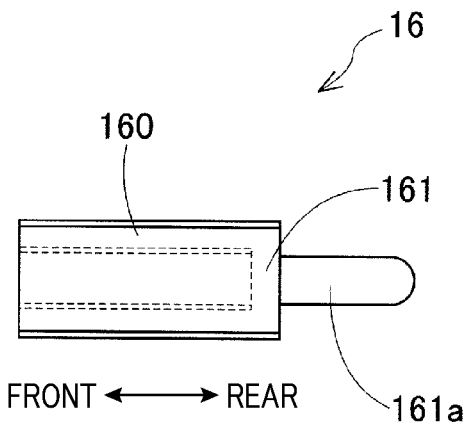
FIG. 9 is a side view of a covering member.
Figure 10:
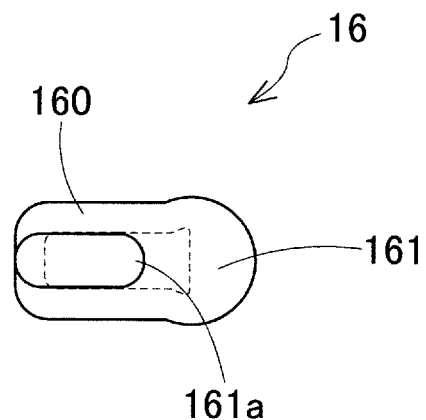
FIG. 10 is a front view of the covering member.
Figure 11:
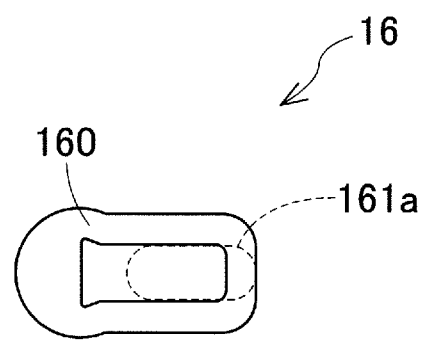
FIG. 11 is a rear view of the covering member.
Figure 12:
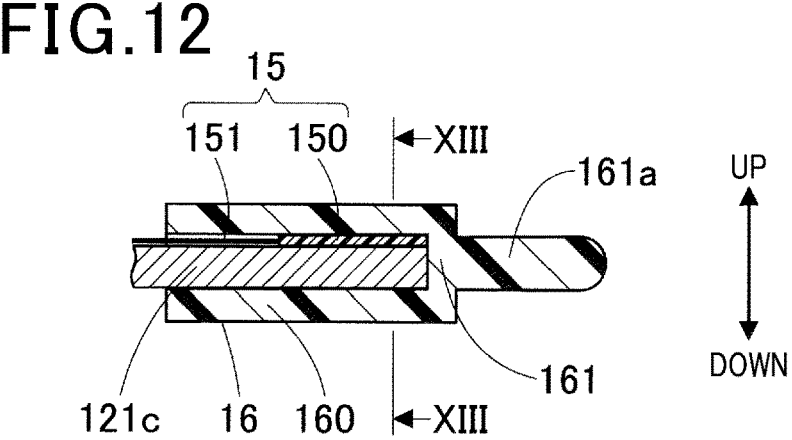
FIG. 12 is a cross-sectional view of ends of drawn portions provided with a detection part and covered with the covering member.
Figure 13:
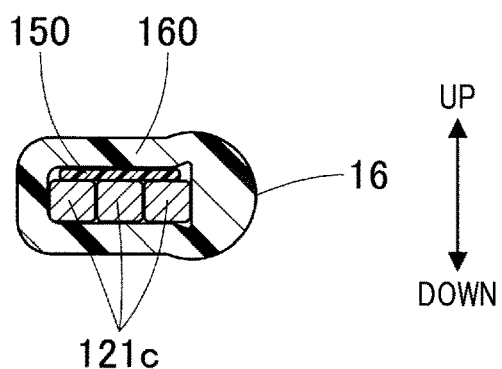
FIG. 13 is a cross-sectional view taken along the line XIII-XIII of FIG. 12.

As shown in FIGS. 1 and 8, the temperature detection element 15 detects temperature of the stator coil 121. Specifically, the temperature detection element 15 detects temperature of the drawn portions 121*c* of the stator coil 121. For example, the temperature detection element 15 is a thermistor element whose resistance changes with change of temperature. The temperature detection sensor 15 includes a detection part 150 and a terminal part 151.

The detection part 150 detects temperature. The terminal part 151 is a rod-like member made of metal to be connected to the detection part 150. The terminal part 151 is provided being protruded from a side face of the detection part 150.

As shown in FIG. 8, the temperature detection element 15 is mounted to ends of the drawn portions 121c so as to be in contact with the ends. Specifically, the temperature detection element 15 is mounted to ends of the drawn portions 121c such that the detection part 150 is in contact with the ends. Furthermore, the temperature detection element 15 is disposed such that the terminal part 151 is parallel to the drawn portions 121c, while an end of the terminal part 151 is oriented to the stator core 120. The end of the terminal part 151 is connected to the control unit via a wire lead.

As shown in FIGS. 1 and 8, the covering member 16 covers not only the detection part 150 of the temperature detection element 15, but also the ends of the drawn portions 121c provided with the detection part 150. The covering member 16 holds the detection part 150 while pressing it against the ends of the drawn portions 121c. The covering member 16 is made of a material whose thermal conductivity is lower than that of the conductor configuring the stator coil 121. Specifically, the covering member 16 is made of rubber having insulation properties. As shown in FIGS. 9 to 13, the covering member 16 includes a cylindrical part 160 and a bottom part 161.

The cylindrical part 160 covers not only the detection part 150 of the temperature detection element 15, but also the outer peripheries of the ends of the drawn portions 121c provided with the detection part 150. Specifically, the cylindrical part 160 has an interior where the detection part 150 and the ends of the drawn portions 121c are disposed. The cylindrical part 160 is configured to cover not only the detection part 150 but also the terminal part 151 of the temperature detection element 15.

The bottom part 161 closes an opening of the cylindrical part 160, the opening facing the ends of the drawn portions 121c. The bottom part 161 has an outer surface on which a protrusion 161a to be in contact with the contact member 171 is formed.

As shown in FIGS. 1, 7 and 8, the wall member 170 is a wall-like member made of metal. The wall member 170 prevents the ends of the drawn portions 121c from splashing with the coolant 14. The coolant 14 is dispersed with the rotation of the rotor 11. Even under such conditions, the wall member 170 prevents splash of the coolant 14 over the ends of the drawn portions 121c provided with the detection part 150 of the temperature detection element 15 and covered with the covering member 16. The wall member 170 has a through hole 170a for inserting therethrough the ends of the drawn portions 121c provided with the detection part 150 and covered with the covering member 16. Specifically, the wall member 170 has a through hole 170a for inserting therethrough the ends of the drawn portions 121c provided with the detection part 150 and covered with the covering member 16, so that a predetermined clearance is formed between the inner peripheral surface of the wall member 170 and the ends of the drawn portions 121c. As shown in FIG. 8, the wall member 170 is provided to the housing 13 so as to axially face an axial end face of the stator core 120 via a predetermined clearance. The wall member 170 is provided to the housing 13 such that the detection part 150 is located at a position deeper (on the rear side) than a position P of a stator core 120 side opening of the through hole 170a. The through hole 170a includes a first opening face 170a1 at the stator core side, and a second opening face 170a2 opposite thereto along the feed-through direction F. Specifically, the wall member 170 is provided to the housing 13 such that the detection part 150 is located at a position that is apart rearward from the opening position P by a predetermined distance, in the front-rear direction (through hole direction) of the through hole 170a The through hole 170a is designed to have a size sufficient for the insertion of the ends of the drawn portions 121c provided with the detection part 150 and covered with the covering member 16, with a tolerance to thickness variation of the ends of the drawn portions 121c. With these requirements being satisfied, the through hole 170a is designed to have a minimum size. As shown in FIGS. 1, 7 and 8, the wall member 170 is integrally provided to the center housing 130.

As shown in FIGS. 1 and 8, the contact member 171 is a wall-like member made of metal. The contact member contacts the bottom part 161 of the covering member 16 to support the ends of the drawn portions 121c provided with the detection part 150 of the temperature detection element 15 and covered with the covering member 16. The contact member 171 is provided to face and contact the bottom part 161 of the covering member 16 in the axial direction. Specifically, the contact member 171 is provided to contact an end of the protrusion 161a of the bottom part 161. More specifically, the contact member 171 is provided to contact the protrusion 161a with an end of the protrusion being bent. The contact member 171 is provided separately from the center housing 130 and is fixed to the center housing 130.

Figure 14:
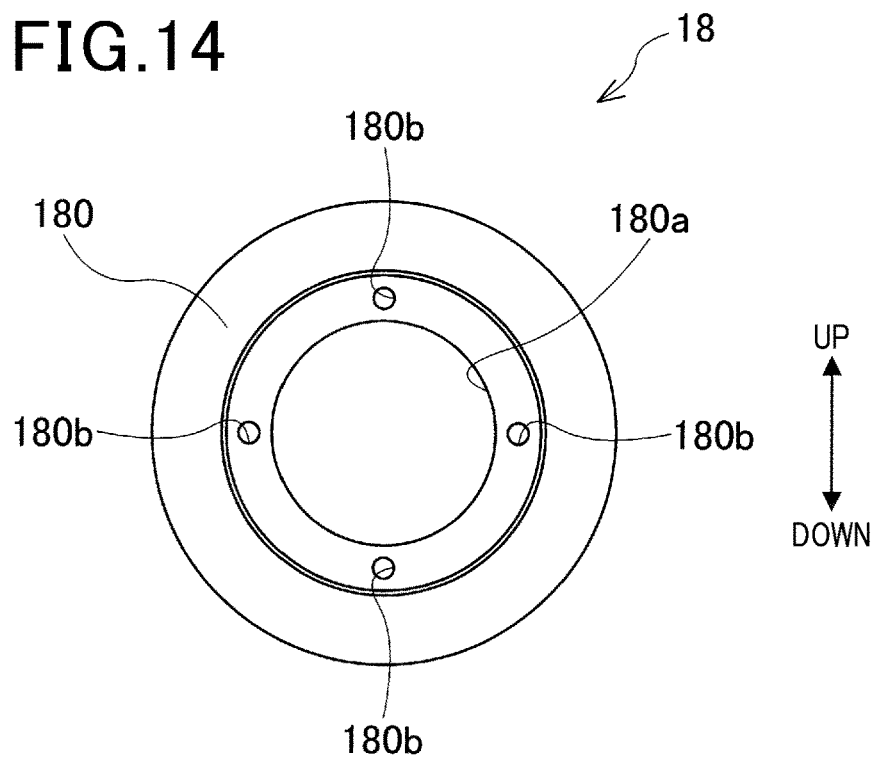
FIG. 14 is a front view of a rear-side flow direction regulation member.
Figure 15:
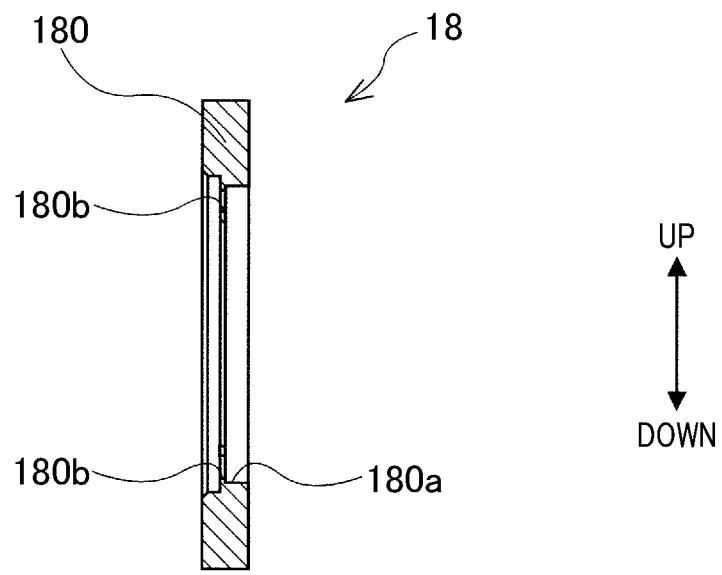
FIG. 15 is an axial cross-sectional view of the rear-side flow direction regulation member.
Figure 16:
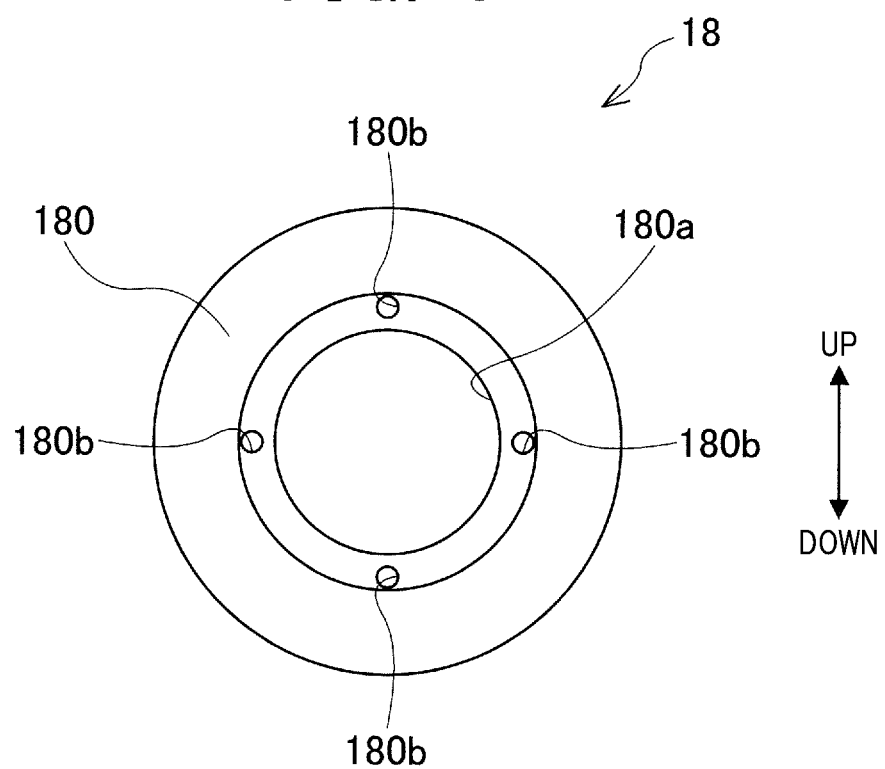
FIG. 16 is a rear view of the rear-side flow direction regulation member.

As shown in FIG. 1, the flow direction regulation member 18 is made of metal. The flow direction regulation member 18 regulates flow of the coolant 14 on the rear side of the rotor 11. As shown in FIGS. 14 to 16, the flow direction regulation member 18 includes a body 180.

The body 180 is a disc-like part. The body 180 has a planar surface that faces an axial end face of the rotor 11. The body 180 includes a rotary shaft insertion hole 180a and bolt insertion holes 180b.

The rotary shaft insertion hole 180a is a circular hole through which the rotary shaft 10 is inserted. The rotary shaft insertion hole 180a is provided at the center of the body 180.

The bolt insertion holes 180b are circular holes through which bolts are respectively inserted to fix the body 180. The number of bolt insertion holes 180b is four. The four bolt insertion holes 180b are circumferentially provided at even intervals on the outside of the rotary shaft insertion hole 180a.

As shown in FIG. 1, the flow direction regulation member 18 in a state of the rotary shaft 10 being inserted into the rotary shaft insertion hole 180a is disposed so as to axially face the axial rear end face of the rotor 11 via a predetermined clearance. The flow direction regulation member 18 is fixed to the center housing 130 by bolts which are inserted into the respective bolt insertion holes 180b. The flow direction regulation member 18 regulates flow of the coolant 14 using a gap 180c formed between itself and the axial rear end face of the rotor 11. The flow direction regulation member 18 is designed such that an outer peripheral side opening 180d of the gap 180c radially faces the coil end portions 121b and the spaces 121e.

Figure 17:
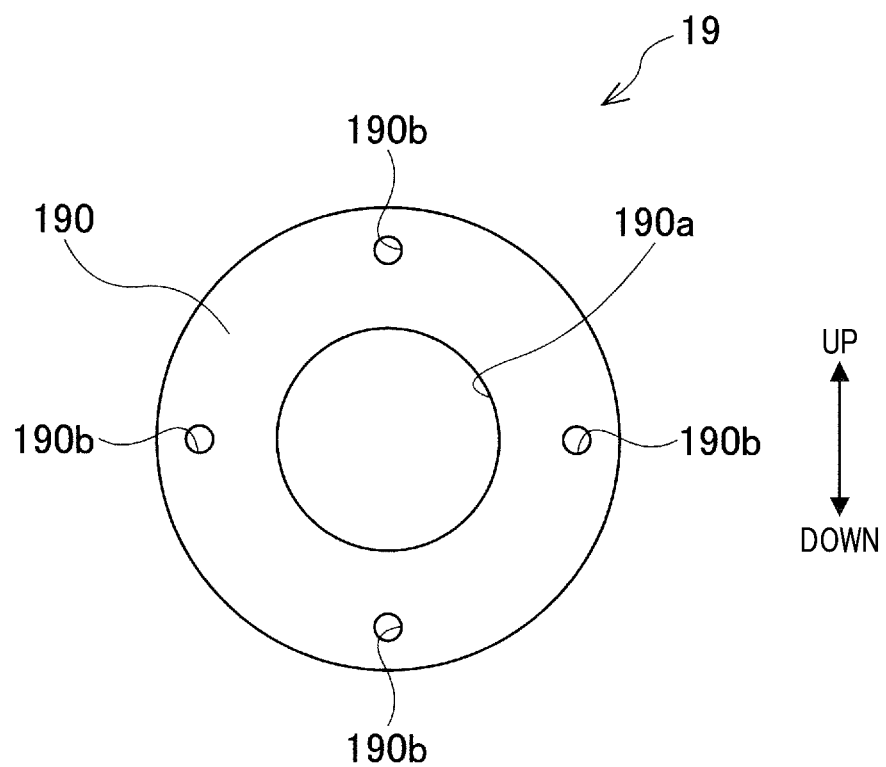
FIG. 17 is a front view of a front-side flow direction regulation member.
Figure 18:
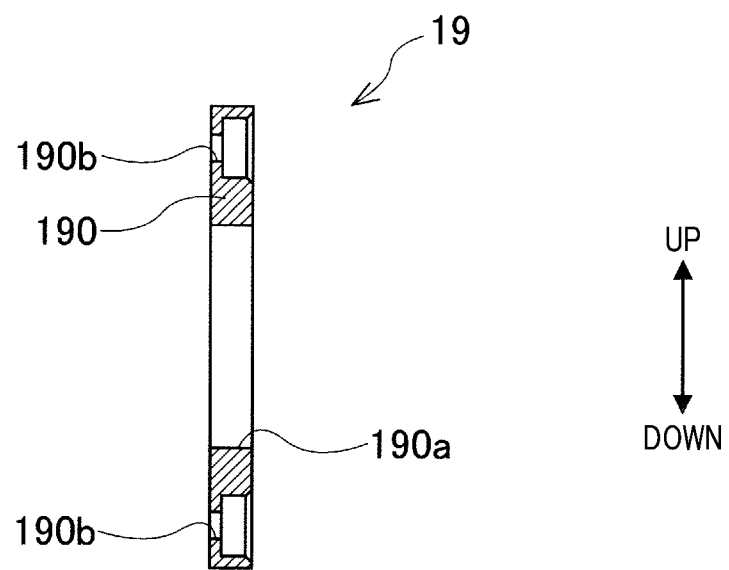
FIG. 18 is an axial cross-sectional view of the front-side flow direction regulation member.
Figure 19:
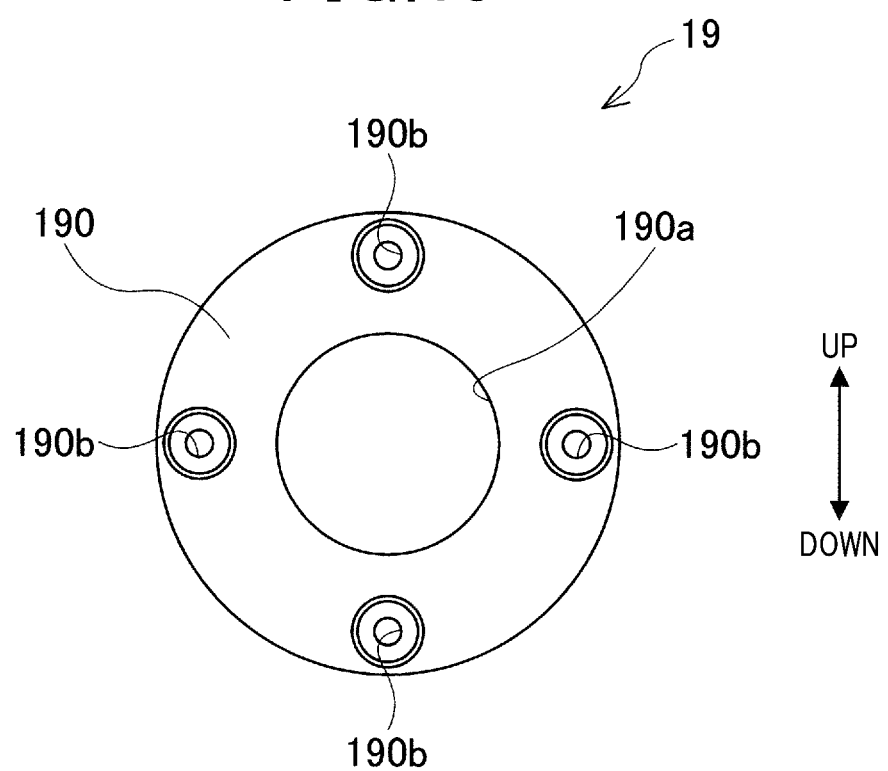
FIG. 19 is a rear view of the front-side flow direction regulation member.

As shown in FIG. 1, the flow direction regulation member 19 is made of metal. The flow direction regulation member 19 regulates flow of the coolant 14 on the front side of the rotor 11. As shown in FIGS. 17 to 19, the flow direction regulation member 19 includes a body 190.

The body 190 is a disc-like part. The body 190 has a planar surface that faces an axial end face of the rotor 11. The body 190 includes a rotary shaft insertion hole 190a and bolt insertion holes 190b.

The rotary shaft insertion hole 190a is a circular hole through which the rotary shaft 10 is inserted. The rotary shaft insertion hole 190a is provided at the center of the body 190.

The bolt insertion holes 190b are circular holes through which bolts are respectively inserted to fix the body 190. The number of bolt insertion holes 190b is four. The four bolt insertion holes 190b are circumferentially provided at even intervals on the outside of the rotary shaft insertion hole 190a.

As shown in FIG. 1, the flow direction regulation member 19 in a state of the rotary shaft 10 being inserted into the rotary shaft insertion hole 190a is disposed so as to axially face the axial front end face of the rotor 11 via a predetermined clearance. The flow direction regulation member 19 is fixed to the center housing 131 by bolts which are inserted into the respective bolt insertion holes 190b. The flow direction regulation member 19 regulates flow of the coolant 14 using a gap 190c formed between itself and the axial front end face of the rotor 11. The flow direction regulation member 19 is designed such that an outer peripheral side opening 190d of the gap 190c radially faces the coil end portions 121b and the spaces 121e.

Referring to FIG. 1, operation of the motor-generator 1 of the present embodiment will be described.

The motor-generator 1 serves as a motor by electrical power being supplied from a battery. When electrical power is supplied to the motor-generator 1 from the battery, current passes through the stator coil 121 to generate magnetic flux. The rotor 11 generates torque by magnetic flux generated in the stator 12 being interlinked with the rotor 11. Thus, the motor-generator 1 generates a drive force for driving the vehicle.

The motor-generator 1 also serves as a generator by a drive force being supplied from an engine. When a drive force is supplied from the engine, the rotor 11 rotates in the motor-generator 1. The stator coil 121 generates alternating current by being interlinked with the magnetic flux generated by the rotor 11. Thus, the motor-generator 1 generates electrical power for charging the battery.

Advantageous effects of the motor-generator 1 of the present embodiment configured as described above will be described.

According to the present embodiment, the motor-generator 1 includes the rotary shaft 10, the rotor 11, the stator core 120, the stator coil 121, the housing 13, the liquid coolant 14, the temperature detection element 15, the covering member 16 and the wall member 170. The rotor 11 is fixed to the rotary shaft 10. The stator core 120 is disposed such that the inner peripheral surface thereof faces the outer peripheral surface of the rotor 11 in the radial direction via a predetermined clearance. The stator coil 121 is formed of a conductor. The stator coil 121 is provided to the stator core 120. The stator coil 121 has the coil end portions 121b, and the drawn portions 121c and 121d. The coil end portions 121b are protruded in the axial direction from an axial end face of the stator core 120. The drawn portions 121c and 121d are further protruded in the axial direction than the coil end portions 121b. The housing 13 covers both axial end faces of the stator core 120 and holds the rotor 11, the coil end portions 121b and the drawn portions 121c and 121d.

The housing 13 rotatably supports the rotary shaft. The coolant 14 is injected into a space defined by the housing 13 and flows into at least a part of clearance between the outer peripheral surface of the rotor 11 and the inner peripheral surface of the stator 12. The temperature detection element 15 is disposed in a state in which the detection part 150 is in contact with ends of the drawn portions 121c. The covering member 16 covers the detection part 150 of the temperature detection element 15 and the ends of the drawn portions 121c provided with the detection part 150. The wall member 170 has the through hole 170a for inserting therethrough the ends of the drawn portions 121c provided with the detection part 150 and covered with the covering member 16. The wall member 170 is provided to the housing 13 so as to axially face an axial end face of the stator core 120 via a predetermined clearance. The wall member is provided to the housing 13 such that the detection part 150 of the temperature detection element 15 is located at a position deeper (on the rear side) than the position P of the stator core 120 side opening of the through hole 170a.

The detection part 150 of the temperature detection element is mounted to the ends of the drawn portions 121c which are further protruded in the axial direction than the coil end portions 121b. Therefore, compared to the case where the detection part 150 is mounted to the coil end portions 121b, the coolant 14, which is dispersed with the rotation of the rotor 11, is unlikely to be splashed over the detection part 150. The detection part 150 and the ends of the drawn portions 121c provided with the detection part 150 are covered with the covering member 16. Therefore, the dispersed coolant 14 are not directly splashed over the detection part 150. Furthermore, the ends of the drawn portions 121c provided with the detection part 150 and covered with the covering member 16 are inserted into the through hole 170a of the wall member 170 which is disposed so as to axially face an axial end face of the stator core 120. In this case, the detection part 150 is located at a position deeper (on the rear side) than the position P of the stator core 120 side opening of the through hole 170a. Therefore, the dispersed coolant 14 is blocked by the wall member 170 and is unlikely to be splashed over the detection part 150. Accordingly, even when the liquid coolant 14 is dispersed with the rotation of the rotor 11 in the motor-generator 1 of the present embodiment, the dispersed coolant 14 is prevented from splashing over the detection part 150 of the temperature detection element 15. Consequently, in the motor-generator 1 of the present embodiment, temperature of the stator coil 121 can be correctly detected.

The motor-generator 1 of the present embodiment includes the flow direction regulation member 18 that regulates flow direction of the coolant 14. The flow direction regulation member 18 is provided so as to axially face an axial end face of the rotor 11 via a predetermined clearance. The flow direction regulation member 18 regulates flow direction of the coolant 14 using the gap 180c formed between itself and an axial end face of the rotor 11. Thus, in the motor-generator 1 of the present embodiment, the direction of spraying or dispersion of the coolant 14 caused with the rotation of the rotor 11 can be regulated in the radial direction by the flow direction regulation member 18. In this way, the motor-generator 1 of the present embodiment can prevent the coolant 14 from being dispersed toward the detection part 150 of the temperature detection element 15 which is mounted to the ends of the axially protruded drawn portions 121c. Accordingly, even when the coolant 14 is dispersed in the motor-generator 1 of the present embodiment, the dispersed coolant 14 is reliably prevented from splashing over the detection part 150 of the temperature detection element 15.

Figure 20:
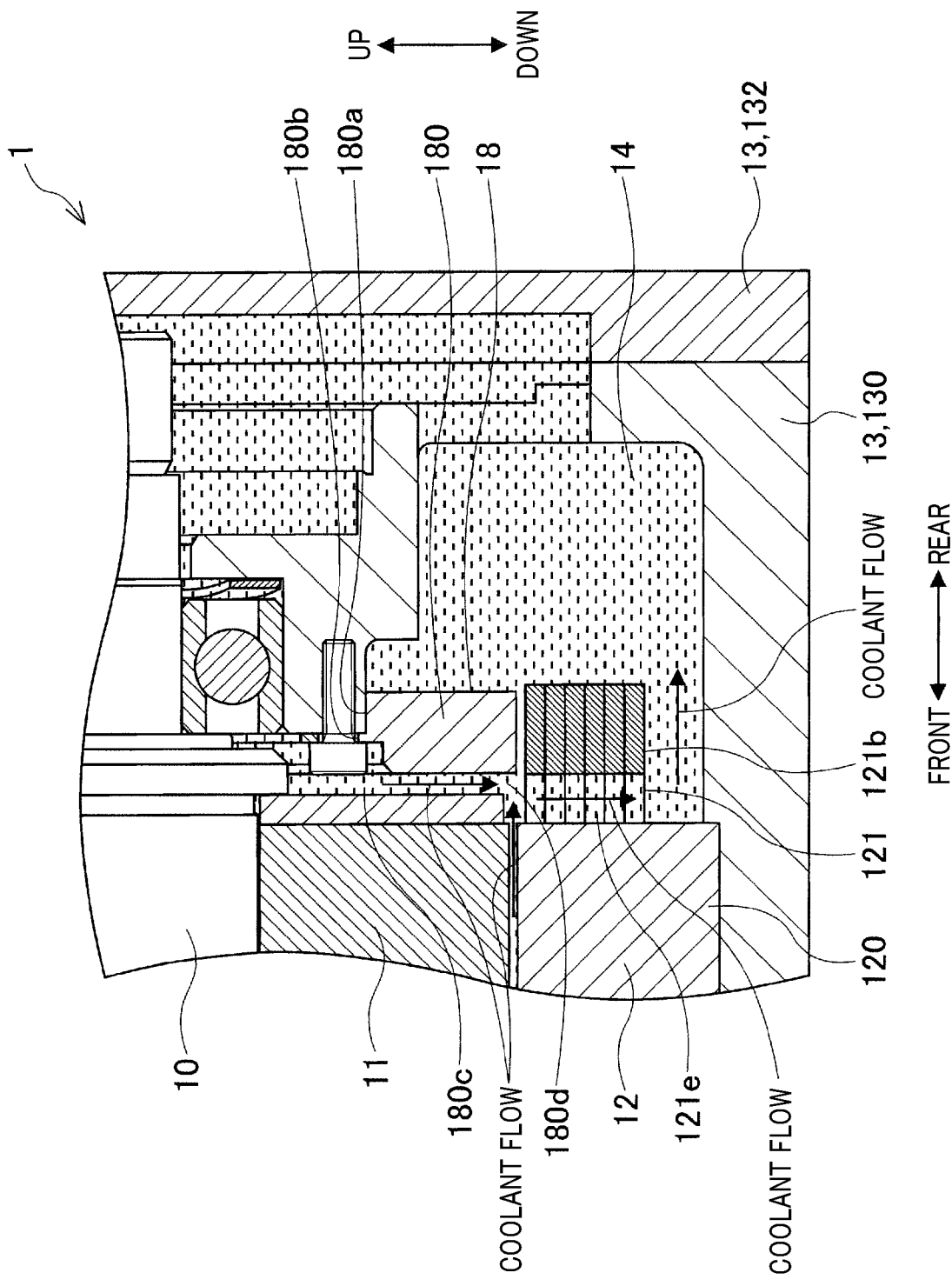
FIG. 20 is an enlarged cross-sectional view of a lower-rear portion of FIG. 1, explaining a flow of a coolant.

As shown in FIG. 20, rotation of the rotor 11 generates a centrifugal force. The centrifugal force causes flow in the reserved coolant 14. Thus, the coolant 14 is collected to the gap 180c which is formed between an axial end face of the rotor 11 and the flow direction regulation member 18. The collected coolant 14 is discharged in the radial direction by the centrifugal force of the rotor 11. Consequently, a negative pressure is generated due to Venturi effect, thereby discharging the coolant 14 that has flowed in between the outer peripheral surface of the rotor 11 and the inner peripheral surface of the stator 12. Thus, the motor-generator 1 of the present embodiment can decrease loss of the coolant 14 that has flowed in between the outer peripheral surface of the rotor 11 and the inner peripheral surface of the stator 12, the loss being due to the shear force generated when the rotor 11 rotates. The motor-generator 1 of the present embodiment can improve performance of cooling the coil end portions 121b, owing to the coolant 14 that is discharged from between the outer peripheral surface of the rotor 11 and the inner peripheral surface of the stator 12. The motor-generator 1 of the present embodiment limits the amount of the coolant 14 in the gap 180c as the velocity of the rotor 11 increases. Therefore, the motor-generator 1 of the present embodiment minimizes agitation loss of the coolant 14 due to increase of velocity of the rotor 11. It should be noted that the loss of the coolant 14 due to shear force or the agitation loss of the coolant 14 can also be reduced by the flow direction regulation member 19.

According to the present embodiment, the motor-generator 1 includes the covering member 16 which includes the cylindrical part 160 and the bottom part 161. The cylindrical part 160 covers not only the detection part 150 of the temperature detection element 15, but also the outer peripheries of the ends of the drawn portions 121c provided with the detection part 150. The bottom part 161 closes an opening of the cylindrical part 160, the opening facing the ends of the drawn portions 121c. Thus, in the motor-generator 1 of the present embodiment, the covering member 16 can reliably cover the detection part 150 of the temperature detection element 15 and the ends of the drawn portions 121c provided with the detection part 150. Accordingly, in the motor-generator 1 of the present embodiment, the liquid coolant 14 dispersed with the rotation of the rotor 11 is reliably prevented from being directly splashed over the detection part 150 of the temperature detection element 15.

According to the present embodiment, the motor-generator 1 includes the contact member 171. The contact member 171 is provided to the housing 13 so as to face and contact the bottom part 161 of the covering member 16 in the axial direction. Thus, the contact member 171 can support the ends of the drawn portions 121c via the covering member 16. In this way, the motor-generator 1 of the present embodiment can reduce or prevent damage to the drawn portions 121c provided with the detection part 150 of the temperature detection element 15, even when vibration due to rotation of the rotor 11 is applied. The bottom part 161 includes the protrusion 161a. Thus, in the motor-generator 1 of the present embodiment, the bottom part 161 can be reliably brought into contact with the contact member 17 via the protrusion 161a even when there is axial variation in position of the ends of the drawn portions 121c provided with the detection part 150 and covered with the covering member 16.

According to the motor-generator 1 of the present embodiment, the drawn portions 121c provided with the detection part 150 of the temperature detection element 15 are disposed at a position where they are not immersed in the coolant 14 when the rotor 11 is not rotating. When the rotor 11 rotates, the coolant 14 is dispersed with the rotation. Consequently, the level of the liquid surface of the coolant 15, which is reserved in the space defined by the housing 13, is lowered compared to the case where the rotor 11 is not rotating. Therefore, the drawn portions 121c disposed at a position where they are not immersed in the coolant 14 when the rotor 11 is not rotating will not be immersed in the coolant 14 even when the rotor 11 starts rotating. Thus, in the motor-generator 1 of the present embodiment, the detection part 150 is not immersed in the coolant 14, regardless of whether the rotor 11 is rotating or not. Accordingly, in the motor-generator 1 of the present embodiment, temperature of the stator coil 121 can be constantly detected by the temperature detection element 15, regardless of whether the rotor 11 is rotating or not.

In the motor-generator 1 of the present embodiment, the covering member 16 has thermal conductivity that is lower than that of the conductor configuring the stator coil 121. Thus, in the motor-generator 1 of the present embodiment, the covering member 16 can prevent the detection part 150 of the temperature detection element 15 from being thermally affected. Accordingly, in the motor-generator 1 of the present embodiment, the detection part 150 of the temperature detection element 15 is ensured not to be thermally affected by the coolant 14 even when the coolant 14 is splashed over the covering member 16.

In the motor-generator 1 of the present embodiment, the covering member 16 presses the detection part 150 of the temperature detection element 15 against the ends of the drawn portions 121c. Thus, in the motor-generator 1 of the present embodiment, the covering member 16 can reliably bring the detection part 150 into contact with the ends of the drawn portions 121c. Accordingly, in the motor-generator 1 of the present embodiment, temperature of the stator coil 121 can be reliably detected.

In the motor-generator 1 of the present embodiment, the covering member 16 is made of rubber. Thus, in the motor-generator 1 of the present embodiment, thermal conductivity of the covering member 16 is reliably made lower than that of the conductor configuring the stator coil 121. In the motor-generator 1 of the present embodiment, elasticity of the rubber reliably contributes to pressing the detection part 150 of the temperature detection element 15 against the ends of the drawn portions 121c.

Figure 21:
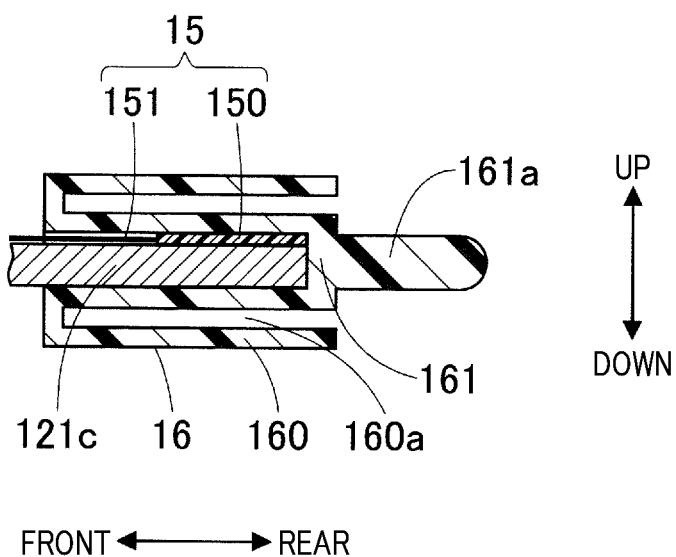
FIG. 21 is a cross-sectional view of a covering member according to another embodiment.

The above embodiment has been described by way of an example in which the covering member 16 includes a cylindrical part 160. However, configuration is not limited thereto. For example, as shown in FIG. 21, the cylindrical part 160 may have a multi-layered structure of having a plurality of inner and outer tubular layers. In this case, the cylindrical part 160 may include air layers 160a between the inner and outer tubular layers. Thus, in the configuration of the present modification, the air layers 160a, which are less likely to conduct heat, can contribute to preventing the detection part 150 of the temperature detection element 15 from being thermally affected. Accordingly, in the configuration of the present modification, the detection part 150 is ensured not to be thermally affected by the coolant 14 even when the coolant 14 is splashed over the covering member 16. This cylindrical part 160 is folded back in the front-rear direction to form the air layers 160a. Thus, in the configuration of the present modification, the coolant 14 is prevented from entering the air layers 160a from the front of the cylindrical part 160 in the front-rear direction, and thus heat insulating effect is prevented from being impaired.

Figure 22:
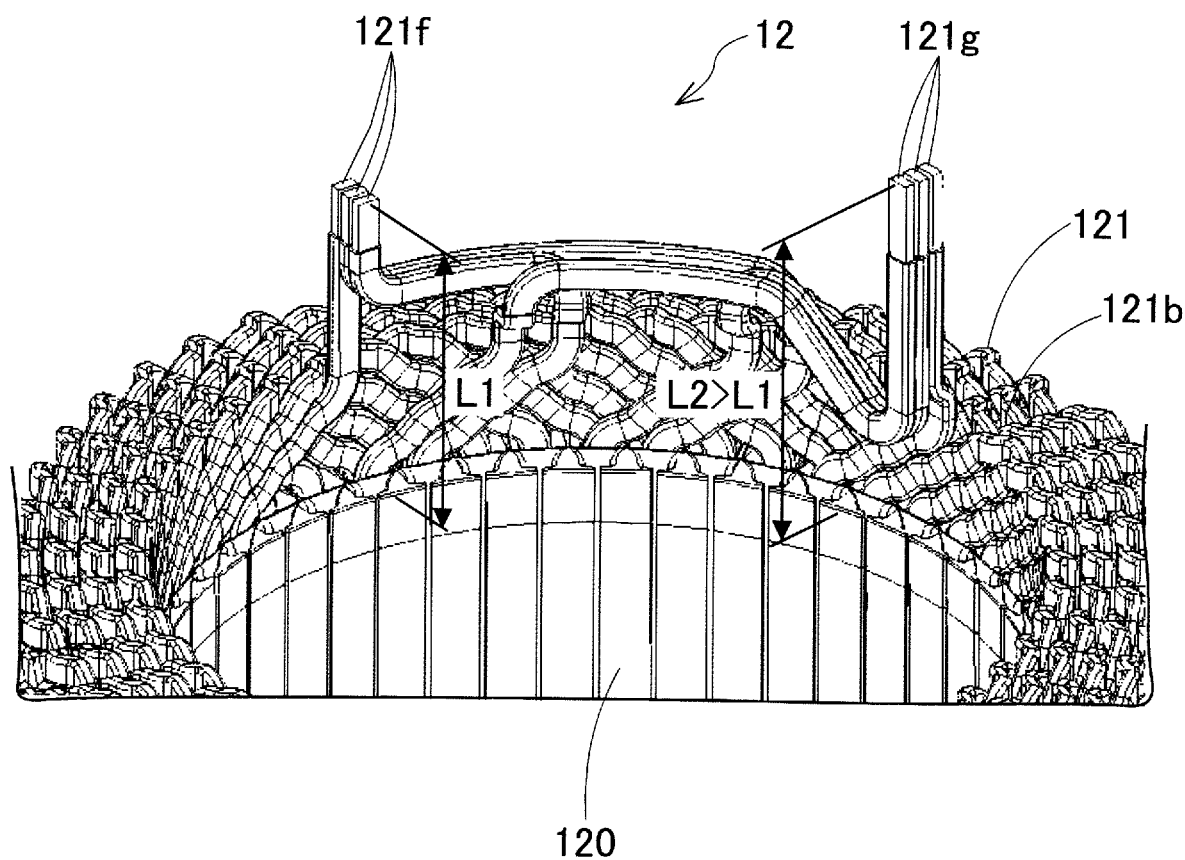
FIG. 22 is a perspective view of a stator, explaining positions where a temperature detection element is to be located in the case where a plurality of sets of drawn portions are provided.

The above embodiment has been described by way of an example in which the detection part 150 of the temperature detection element 15 is mounted to the ends of the drawn portions 121c forming a neutral point. However, configuration is not limited thereto. The detection part 150 may be mounted to ends of any drawn portions as long as the drawn portions are further protruded in the axial direction than the coil end portions 121b. As shown in FIG. 22, the stator coil 121 may have a plurality of sets of drawn portions 121f and 121g. In this case, the detection part 150 may be mounted to the ends of the drawn portions 121g which are most protruded in the axial direction among the plurality of sets of drawn portions 121f and 121g. Thus, in the configuration of the present modification, the detection part 150 of the temperature detection element 15 can be disposed at a further distant position in the axial direction. Accordingly, the configuration of the present modification can further reduce the probability that the coolant 14 dispersed with the rotation of the rotor 11 is splashed over the detection part 150.

The above embodiment has been described by way of an example in which the drawn portions 121c provided with the detection part 150 of the temperature detection element 15 are disposed at a position where they are not immersed in the coolant 14 when the rotor 11 is not rotating. However, configuration is not limited thereto. The drawn portions provided with the detection part 150 may be disposed at a position where they are immersed in the coolant 14 when the rotor 11 is not rotating and are not immersed in the coolant 14 when the rotating speed of the rotor 11 has become not less than a predetermined value. Thus, in the configuration of the present modification, the liquid surface of the coolant 14 is lowered when the rotating speed of the rotor 11 has become not less than a predetermined value, so that the detection part 150 will no longer be immersed in the coolant 14. Therefore, in the configuration of the present modification, temperature of the stator coil 121 can be detected by the temperature detection element 15 when the rotating speed of the rotor 11 is not less than a predetermined value. In the configuration of the present modification, the detection part 150 is immersed in the coolant 14 when the rotor 11 is not rotating. Therefore, in the configuration of the present modification, temperature of the coolant 14 can be detected by the temperature detection element 15 when the rotor 11 is not rotating. In other words, in the configuration of the present modification, temperature of the coolant 14 can be detected when the rotor 11 is not rotating, by using the temperature detection element 15 provided for detecting temperature of the stator coil 121. Accordingly, in the configuration of the present modification, a temperature detection element for detecting temperature of the coolant 14 is not required to be separately provided and can be omitted from the components. In other words, in the configuration of the present modification, the number of parts can be reduced and thus the number of processes of assemblage can be reduced.

The above embodiment has been described by way of an example in which the covering member 16 is made of rubber. However, configuration is not limited thereto. For example, the covering member 16 may be made of a resin that shrinks when heated. Thus, in the configuration of the present modification, thermal conductivity of the covering member 16 is reliably made lower than that of the conductor configuring the stator coil 121 owing to the covering member 16 being made of a resin. In the configuration of the present modification, shrinkage of the resin by heating contributes to reliably pressing the detection part 150 of the temperature detection element 15 against the ends of the drawn portions 121c.

The above embodiment has been described by way of an example in which the wall member 170 is provided integrally with the center housing 130. However, configuration is not limited thereto. For example, the wall member 170 may be provided separately from the center housing 13 and may be fixed to the housing 13.

The above embodiment has been described by way of an example in which the contact member 171 is provided separately from the center housing 130 and fixed to the center housing 130. However, configuration is not limited thereto. For example, the contact member 171 may be provided integrally with the housing 13. Thus, in the configuration of the present modification, the number of parts can be reduced and thus the number of processes of assemblage can be reduced.

What is claimed is:

1. A rotary electric machine comprising:
   a rotary shaft;
   a rotor that is fixed to the rotary shaft;
   a stator core that is disposed such that an inner peripheral surface thereof faces an outer peripheral surface of the rotor in a radial direction via a predetermined clearance;
   a stator coil that is formed of a conductor and includes coil end portions protruding in an axial direction from an axial end face of the stator core and drawn portions further protruding in an axial direction than the coil end portions;
   a housing that covers both axial end faces of the stator core, holds the rotor, the coil end portions and the drawn portions, and rotatably supports the rotary shaft;
   a liquid coolant that is injected into a space defined by the housing and flows into at least a part of a clearance between the outer peripheral surface of the rotor and the inner peripheral surface of the stator core;
   a temperature detection element that includes a detection part to detect a temperature and a terminal part provided in an orientation that protrudes from a side face of the detection part, an end of the terminal part being oriented to the stator core, the temperature detection element being mounted to ends of the drawn portions such that the detection part is in contact with the ends;
   a covering member that covers the detection part and the ends of the drawn portions, the ends being provided with the detection part; and
   a wall member that includes a through hole for inserting therethrough the ends of the drawn portions, the ends being provided with the detection part and covered with the covering member, the wall member being provided to the housing such that the wall member faces an axial end face of the stator core in an axial direction via a predetermined clearance and that the detection part is disposed at a position closer to a second opening face of the through hole than to a position of a first opening face of the through hole, the first opening face being an opening face that is located at a stator core side of the through hole.

2. The rotary electric machine according to claim 1, wherein the machine comprises a flow direction regulation member that is disposed to face an axial end face of the rotor in an axial direction via a predetermined clearance, and regulates flow direction of the coolant using a gap formed between an axial end face of the rotor and the flow direction regulation member.

3. The rotary electric machine according to claim 1, wherein
the covering member includes
a cylindrical part that covers the detection part and outer peripheries of the ends of the drawn portions, the ends being provided with the detection part; and
a bottom part that closes an opening of the cylindrical part, the opening being located facing the ends of the drawn portions.

4. The rotary electric machine according to claim 3, wherein the cylindrical part is a multi-layered cylindrical part having a plurality of inner and outer tubular layers, with air layers being provided between the plurality of layers.

5. The rotary electric machine according to claim 3, wherein the machine comprises a contact member that is provided to the housing so as to face and contact the bottom part of the covering member in an axial direction.

6. The rotary electric machine according to claim 1, wherein
the stator coil has a plurality of sets of drawn portions; and
the detection part is disposed at ends of the drawn portions which are protruded most in an axial direction among the plurality of sets of drawn portions.

7. The rotary electric machine according to claim 1, wherein the drawn portions provided with the detection part are disposed at a position where the drawn portions are not immersed in the coolant when the rotor is not rotating.

8. The rotary electric machine according to claim 1, wherein the covering member has thermal conductivity that is lower than that of a conductor configuring the stator coil.

9. The rotary electric machine according to claim 1, wherein the covering member presses the detection part against the ends of the drawn portions.

10. The rotary electric machine according to claim 8, wherein the covering member is made of rubber or a resin that shrinks when heated.

11. A rotary electric machine comprising:
a rotary shaft;
a rotor that is fixed to the rotary shaft;
a stator core that is disposed such that an inner peripheral surface thereof faces an outer peripheral surface of the rotor in a radial direction via a predetermined clearance;
a stator coil that is formed of a conductor and includes coil end portions protruding in an axial direction from an axial end face of the stator core and drawn portions further protruding in an axial direction than the coil end portions;
a housing that covers both axial end faces of the stator core, holds the rotor, the coil end portions and the drawn portions, and rotatably supports the rotary shaft;
a liquid coolant that is injected into a space defined by the housing and flows into at least a part of a clearance between the outer peripheral surface of the rotor and the inner peripheral surface of the stator core;
a temperature detection element that is mounted to ends of the drawn portions such that a detection part is in contact with the ends;
a covering member that covers the detection part and the ends of the drawn portions, the ends being provided with the detection part; and
a wall member that includes a through hole for inserting therethrough the ends of the drawn portions, the ends being provided with the detection part and covered with the covering member, the wall member being provided to the housing such that the wall member faces an axial end face of the stator core in an axial direction via a predetermined clearance and that the detection part is disposed at a position closer to a second opening face of the through hole than to a position of a first opening face of the through hole, the first opening face being an opening face that is located at a stator core side of the through hole,
wherein the covering member includes
a cylindrical part that covers the detection part and outer peripheries of the ends of the drawn portions, the ends being provided with the detection part; and
a bottom part that closes an opening of the cylindrical part, the opening being located facing the ends of the drawn portions, and
wherein the machine comprises a contact member that is provided to the housing so as to face and contact the bottom part of the covering member in an axial direction.

* * * * *